(12) United States Patent
Smalls et al.

(10) Patent No.: US 10,082,843 B2
(45) Date of Patent: Sep. 25, 2018

(54) ADJUSTABLE EXPANSION SLOTS

(71) Applicant: HEWLETT-PACKARD DEVELOPMENT COMPANY, L.P., Houston, TX (US)

(72) Inventors: James Smalls, Houston, TX (US); Corey T Butler, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/519,775

(22) PCT Filed: Apr. 16, 2015

(86) PCT No.: PCT/US2015/026209
§ 371 (c)(1),
(2) Date: Apr. 17, 2017

(87) PCT Pub. No.: WO2016/167775
PCT Pub. Date: Oct. 20, 2016

(65) Prior Publication Data
US 2018/0188784 A1 Jul. 5, 2018

(51) Int. Cl.
*G06F 1/18* (2006.01)

(52) U.S. Cl.
CPC .............. *G06F 1/186* (2013.01); *G06F 1/185* (2013.01)

(58) Field of Classification Search
None
See application file for complete search history.

(56) References Cited

U.S. PATENT DOCUMENTS

| | | | | |
|---|---|---|---|---|
| 4,462,499 A * | 7/1984 | Calabro | ............... | H05K 7/1417 211/41.17 |
| 5,335,050 A * | 8/1994 | Osbourne | .......... | G03G 15/0291 250/324 |
| 5,996,962 A * | 12/1999 | Chang | ..................... | G06F 1/184 248/694 |
| 6,331,940 B1 * | 12/2001 | Lin | ....................... | H05K 7/1431 361/785 |
| 6,409,518 B1 * | 6/2002 | Hung | ..................... | G06F 1/184 361/801 |

(Continued)

FOREIGN PATENT DOCUMENTS

| CN | 2672424 Y | 1/2005 |
|---|---|---|
| CN | 201590019 U | 9/2010 |

(Continued)

OTHER PUBLICATIONS

"Installing and Removing a PCI Card," techpubs library, Jan. 17, 2003, pp. 1-9, Silicon Graphics International Corp.

*Primary Examiner* — Xanthia C Cunningham
(74) *Attorney, Agent, or Firm* — International IP Law Group

(57) ABSTRACT

An example adjustable expansion slot includes a panel with an opening to receive an expansion slot bracket where the panel includes a guiding portion to guide a first end of the expansion slot bracket into an inserted position. The adjustable expansion slot apparatus to further include an adjustable fastener to fasten a second end of the expansion slot bracket into the inserted position. In some examples, the position of the adjustable fastener can be adjusted to accommodate size variations of the expansion slot bracket.

15 Claims, 6 Drawing Sheets

(56) References Cited

U.S. PATENT DOCUMENTS

| | | | | |
|---|---|---|---|---|
| 6,424,521 B1* | 7/2002 | Vega | ............... | G06F 1/186 361/679.31 |
| 6,505,387 B1* | 1/2003 | Yatskov | ............... | E05C 19/06 24/298 |
| 6,772,246 B2* | 8/2004 | Kim | ............... | G06F 1/184 361/753 |
| 6,897,377 B2* | 5/2005 | Gustine | ............... | H05K 5/0004 174/542 |
| 6,920,048 B2 | 7/2005 | Holt et al. | | |
| 7,002,791 B2* | 2/2006 | Diatzikis | ............... | G06F 1/184 361/679.4 |
| 7,626,830 B2 | 12/2009 | Fan et al. | | |
| 7,724,538 B2 | 5/2010 | Tsai et al. | | |
| 8,480,046 B2* | 7/2013 | Liu | ............... | G06F 1/186 248/221.11 |
| 8,749,967 B2 | 6/2014 | Dang | | |
| 2002/0096980 A1* | 7/2002 | Montagna | ............... | G06F 1/184 312/223.1 |
| 2004/0084388 A1* | 5/2004 | Roesner | ............... | G06F 1/184 211/41.17 |
| 2004/0120125 A1* | 6/2004 | Taylor | ............... | G06F 1/184 361/759 |
| 2005/0047080 A1* | 3/2005 | Hsu | ............... | G06F 1/184 361/679.41 |
| 2006/0087801 A1* | 4/2006 | Champion | ............... | G06F 1/185 361/679.41 |
| 2007/0076366 A1* | 4/2007 | Makabe | ............... | G06F 1/185 361/679.39 |
| 2009/0180264 A1 | 7/2009 | Chiang | | |
| 2010/0091453 A1 | 4/2010 | Huang | | |
| 2012/0014053 A1* | 1/2012 | Peng | ............... | G06F 1/185 361/679.4 |
| 2012/0153106 A1 | 6/2012 | Liu | | |
| 2012/0229996 A1* | 9/2012 | Ko | ............... | G06F 1/1633 361/752 |
| 2012/0281373 A1 | 11/2012 | Bohannon et al. | | |
| 2012/0293955 A1* | 11/2012 | Li | ............... | G06F 1/185 361/679.58 |
| 2013/0107441 A1 | 5/2013 | Zhou | | |
| 2014/0168910 A1* | 6/2014 | Yin | ............... | G06F 1/185 361/747 |
| 2015/0146348 A1* | 5/2015 | Liao | ............... | H05K 5/0065 361/679.01 |
| 2015/0296664 A1* | 10/2015 | Peng | ............... | H05K 7/20727 361/679.46 |
| 2016/0216746 A1* | 7/2016 | Oliver | ............... | G06F 1/186 |

FOREIGN PATENT DOCUMENTS

| | | |
|---|---|---|
| TW | 417904 | 1/2001 |
| TW | M294812 | 7/2006 |
| TW | M401235 | 4/2011 |
| TW | M403681 | 5/2011 |
| TW | 201228134 A | 7/2012 |

* cited by examiner

400

500

600

ADJUSTABLE EXPANSION SLOTS

BACKGROUND

Computing devices often incorporate peripheral or additional devices to expand their capabilities. Space for these devices is often accounted for when designing cases and the openings to receive these additional devices are often called expansion slots. As various computing cases and technologies have developed, various sizes of expansion slots have been used. Various sizes of peripheral devices and their mounts have been developed to match these expansion slot sizes.

DETAILED DESCRIPTION

A technique for mounting a peripheral interface device involves mounting the card using a rigid bracket. One method of mounting these devices involves interchanging the mounting bracket for a mounting bracket of the proper size. This process not only involves finding the right sized mounting bracket, but also manually removing one from the peripheral device or card and replacing it with the correct bracket. This exchange process takes time and effort to find the correctly sized bracket for both the peripheral interface device as well as the mounted computing device. Further, in some instances a vendor who created the peripheral interface device may not have even created a bracket that would allow installation into a certain sized computing device.

Examples described herein provide techniques for an adjustable expansion slot that allows mounting of a number of bracket sizes. In some examples the adjustable expansion slot involves a movable fastener that moves between a number of positions along the expansion slot opening. In some examples, an insertable component serves as a fastener to fill the space difference between a full height and low profile bracket. In some examples, the adjustable expansion slot includes grooves at a number of positions that allow fastening of an expansion slot bracket at various bracket sizes directly into the grooves best suited for the bracket size.

Figure 1:
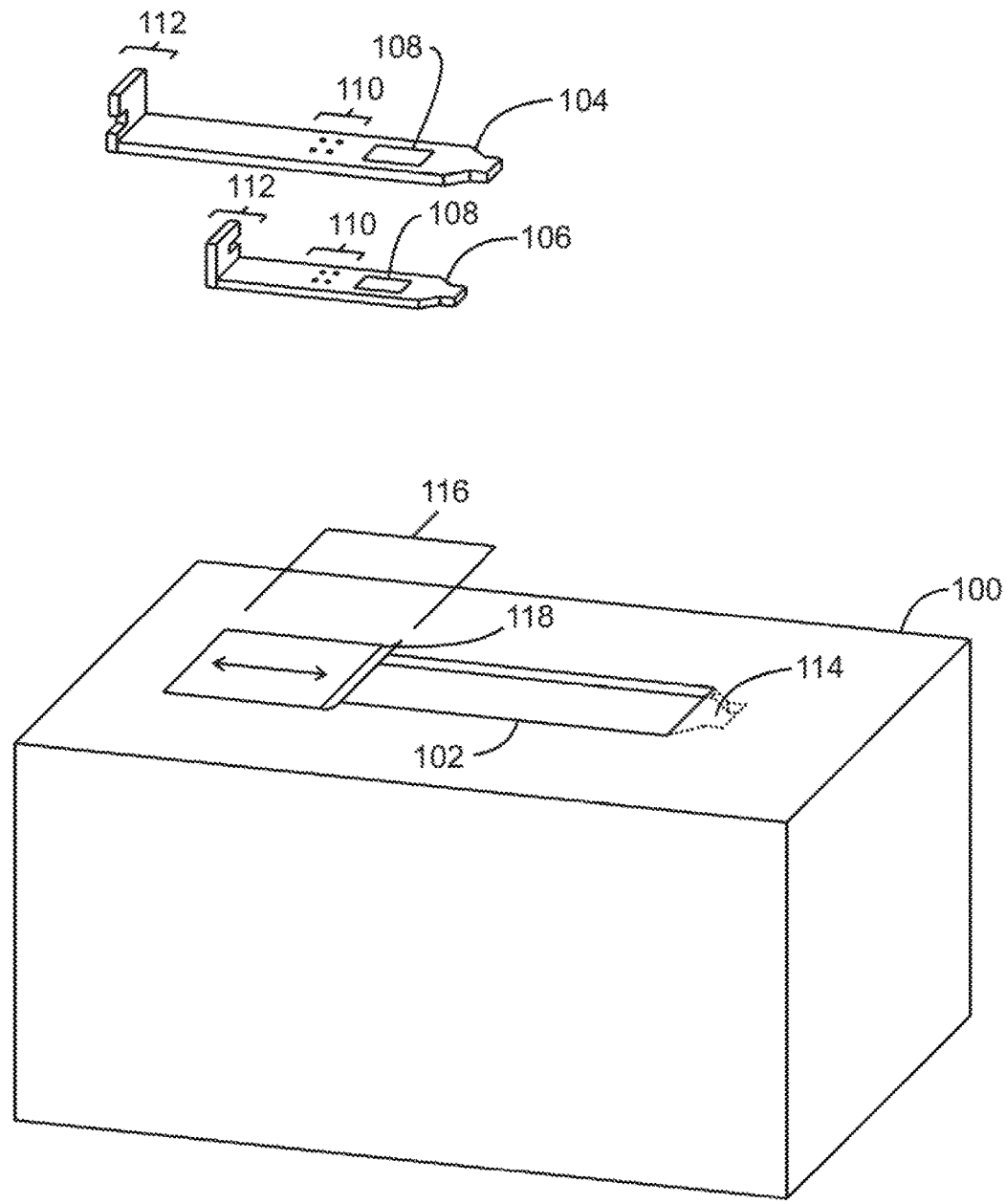
FIG. 1 is an example computing device with an adjustable expansion slot.

FIG. 1 is an example computing device 100 with an adjustable expansion slot. The computing device 100 can be any device that can mount peripheral interfaces, additional devices, or computing cards. This may include desktops, servers, laptops, thin clients, or any other suitable device with insertable computing components. Examples of peripheral interfaces include interfaces following the peripheral component interconnect (PCI) standard or components following the peripheral component interconnect express (PCIe) standard. An expansion slot is a space on a panel of a computing device to hold an input and output devices. The panel may be metal, plastic, or any other suitable casing for the computing device. The brackets that support and affix devices being inserted into expansion slots can each be called an expansion slot bracket. The opening 102 of the panel of the computing device 100 can be a shaped hole to receive an expansion slot bracket. While only one general opening 102 opening is shown, a large number of designs, cuts, and lengths are possible. The opening 102 allows insertion of the peripheral device interface, additional device, or other object for mounting on the computing device 100. The opening 102 of the computing device 100 panel can be shaped to allow mounting of a bracket that braces the peripheral device and holds the device in the computing device 100 in an inserted position.

Both full height expansion slot bracket 104 and a low profile expansion slot bracket 106 are shown to illustrate not only a variation of size, but also two common standards in the length of mounting brackets. Another name for full height brackets are ATX form factor brackets and similar naming conventions. Low profile brackets are often referred to as half height brackets. However, the attached Figures are for explanation purposes only and are not drawn to scale. Accordingly, the full height expansion slot bracket 104 and low profile expansion slot bracket 106 are purely exemplary and are not drawn to scale of these size standards.

Although each bracket design may be unique to the device it is holding and the input and output (I/O) ports used, for reference I/O openings 108 are shown in the full height expansion slot bracket 104 and the low profile expansion slot bracket 106. Additionally, light-indicators openings 110 are shown as well. Again these light-indicators openings 110 are customizable based on the needs of the third party bracket and peripheral device designer and are included here for context. These light-indicators openings 110 can be shaped to allow light emitting diodes or other suitable light sources to emit light through a bracket to be viewed by a user. A bracket fastening end 112 similarly is indicated on both the full height bracket and the low profile bracket. The notches in the bracket fastening end 112 do not necessarily exist in all brackets, and is included here as an example of variations of fastening that can be present in various brackets.

A guiding portion 114 of the opening 102 may receive a corresponding end of an expansion slot bracket. The guiding portion 114 can be a shaped portion of the panel of the computing device 100 or may be a separate component attached to the panel of the computing device 100 near the opening 102. In the context of the guiding portion location, the term "near" means close enough to the opening 102 to enable guiding of an expansion slot bracket into an inserted position in the opening 102. While the guiding portion 114 is shown as corresponding to an end of both the full height expansion slot bracket 104 and the low profile bracket, other shapes may be used in order to accommodate variations in expansion slot bracket molds. The guiding portion 114 is to guide and aid in the fixing of an expansion slot bracket, as well as the attached peripheral device, into the computing device 100 in an inserted position.

An adjustable fastener 116 can be attached on top of, or as a part of the opening 102. The adjustable fastener 116 is designed and positioned in order to move and adjust along the opening in order to match the size of expansion slot bracket used. In some examples, the adjustable fastener 116 will be slid open to reveal the entire opening 102. In this example, a full height bracket would fit. In some examples, the adjustable fastener 116 can be slid across the opening 102 to cover a portion of the opening 102 and only expose an opening 102 the size of the low profile expansion slot bracket 106. A fastening portion 118 of the adjustable fastener 116 engages with an expansion slot bracket to secure the bracket into the inserted position. In some examples, the fastening portion 118 engages or re-engages with the bracket fastening end 112 of either bracket as needed.

Figure 2:
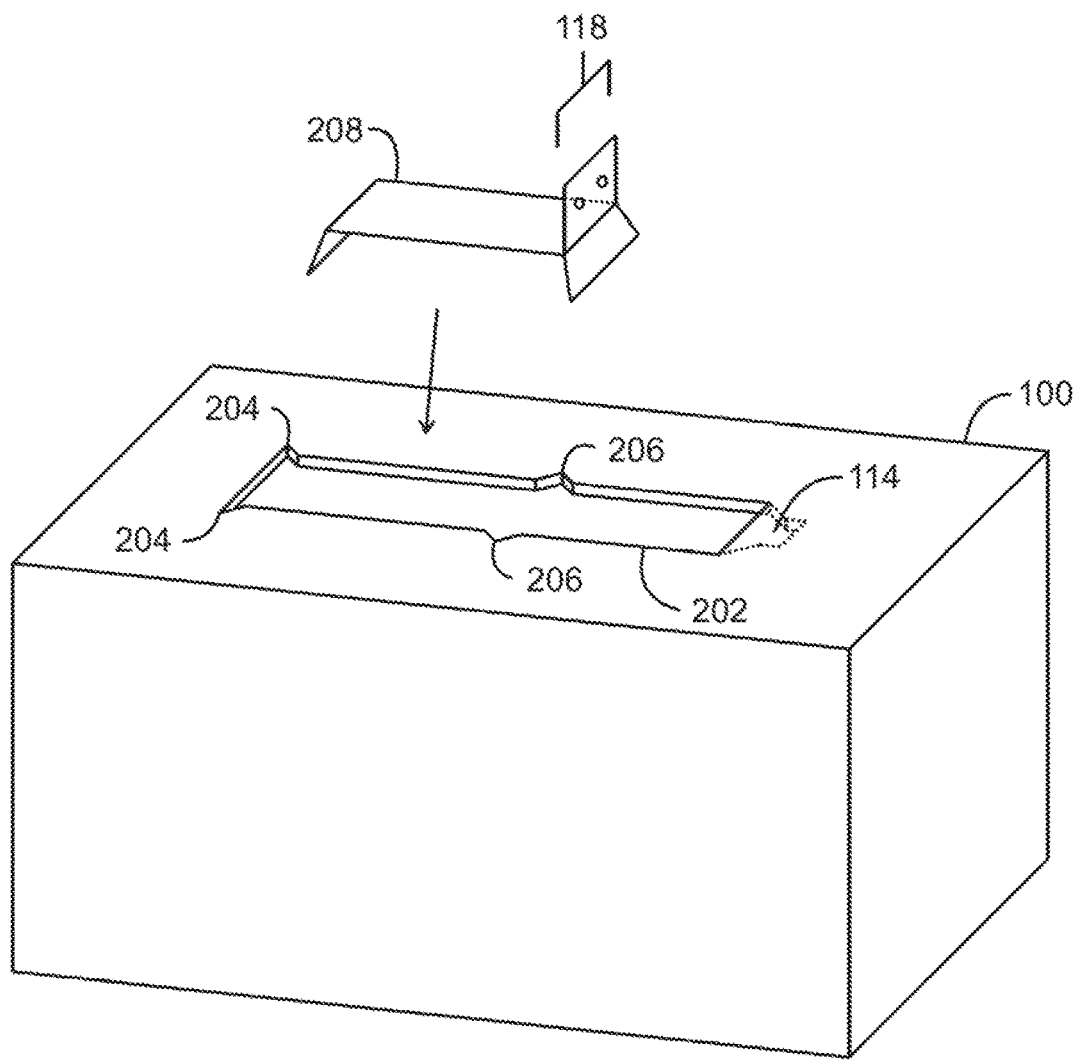
FIG. 2 is an example of a computing device with an adjustable expansion slot and fastening insert.

FIG. 2 is an example of a computing device with an adjustable expansion slot and fastening insert. Like numbered items are as described in FIG. 1. A grooved opening 202 for an expansion slot may allow for various sizes of expansion slot brackets based, in part, on the location of the grooves 204 and 206. A first set of grooves also called full height grooves 204 are shown at the full length of the grooved opening 202. A second set of grooves, also called low profile grooves 206 are shown a distance along the grooved opening 202 that corresponds to the height of a low profile expansion slot bracket 106. In some examples, an expansion slot bracket may be placed into an inserted position by placement in the grooves of the grooved opening 202. A rigid component fastener 208 can be inserted into a portion of the grooved opening between the low profile grooves 206 and the full height grooves 204 to more securely ensure an expansion slot bracket is fastened in an inserted position. The legs of the rigid component fastener 208 would fit into the both sets of grooves 204, 206. In some cases, the rigid component fastener 208 may be shaped so that insertion is only possible at the grooves. This may be accomplished through a trapezoidal shape of the leg inserts of the rigid component fastener 208, specifically shaped to correspond to grooves 204, 206.

In some examples, the rigid component fastener 208 includes a fastening portion 118 that can provide a backstop for an expansion slot bracket opposite the guiding portion 114. The fastening portion 118 can also provide the expansion slot bracket with a surface to fasten to, such that the expansion slot bracket is securely in the inserted position. This fastening between the fastening portion 118 and the bracket fastening end 112 using mechanical means such as screw, metal bracings, hooks. or other adhesive or semi-adhesive means.

Figure 3:
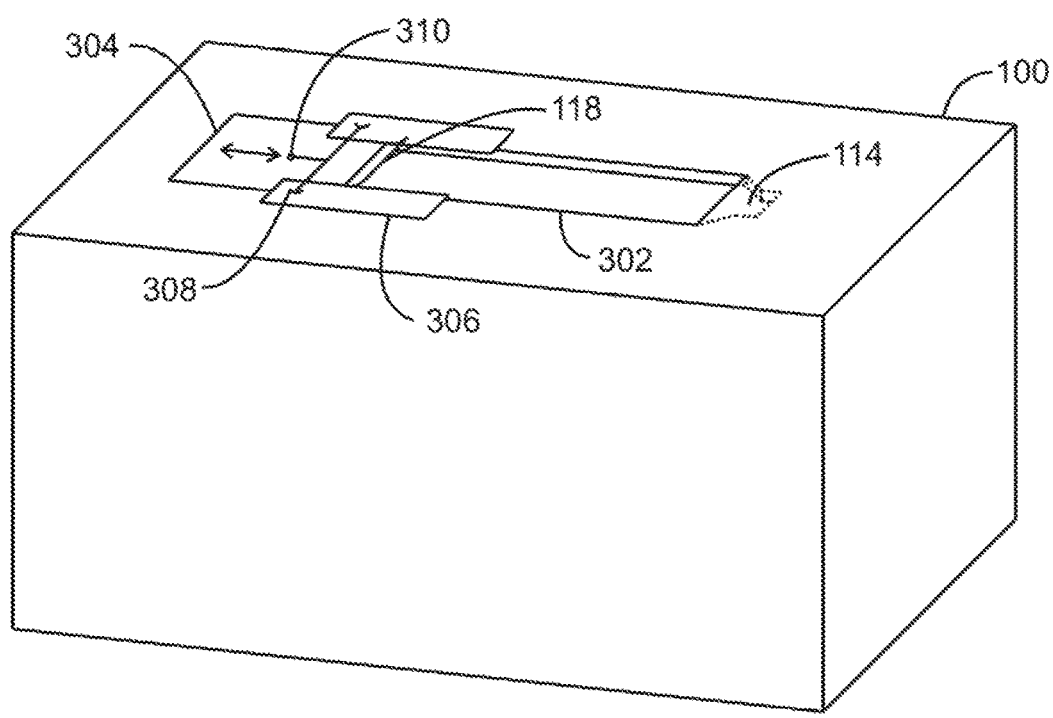
FIG. 3 is an example of a computing device with an adjustable expansion slot with a sliding mechanism.

FIG. 3 is an example 300 of a computing device with an adjustable expansion slot with a sliding mechanism. Like numbered items are as described in FIG. 1. The slide opening 302 can receive a number of expansion slot bracket sizes, not just full height and low profile sizes. In part, this is accomplished by a sliding adjustable fastener 304. The sliding adjustable fastener 304 can be metal to reduce degradation caused by electromagnetic interference (EMI). A number of slide rails 306 may limit the motion of the sliding adjustable fastener 304. In some examples, a slide rail 306 may ensure the sliding adjustable fastener 304 only moves parallel to the slide opening 302 with reference to the guiding portion 114 of the slide opening 302. In some examples, the slide rail 306 may also ensure the adjustable fastener cannot fall off of the computing device 100 panel. The fastening portion 118 can be shaped to fit between any slide rail 306 that is present in order to allow suitable fastening of the sliding 304 adjustable fastener to an expansion slot bracket.

An anchoring hook 308 may be included as part of a latching mechanism of the sliding adjustable fastener 304. The anchoring hook 308 may halt movement of the sliding adjustable fastener 304 along any portion of the slide rail 306 when engaged. An exposed leverage point 310 may aid in engaging and dis-engaging the anchoring hook 308 when manipulated by a user. In some examples, the anchoring hook 308 anchors the sliding adjustable fastener 304 at either a full height distance or a low profile distance corresponding to full height and low profile expansion slot brackets. In some examples, the anchoring hooks 308 may be dis-engaged by manipulation of the exposed leverage point 310 by a user and moved to any position on the slide rail 306. In some examples, the anchoring hook 308 may re-engage with the slide rail 306 when a user ceases manipulation of the exposed leverage point 310. Although the exposed leverage point 310 is shown in FIG. 3, as centered on the adjustable sliding fastener 304, other configurations are possible. In some examples, the exposed leverage point 310 may be the sides of the slide rails 306, such that a user squeezing the slide rails 306 would release an anchoring hook 308 or clip and allow the sliding adjustable fastener 304 to extend or retract.

Figure 4:
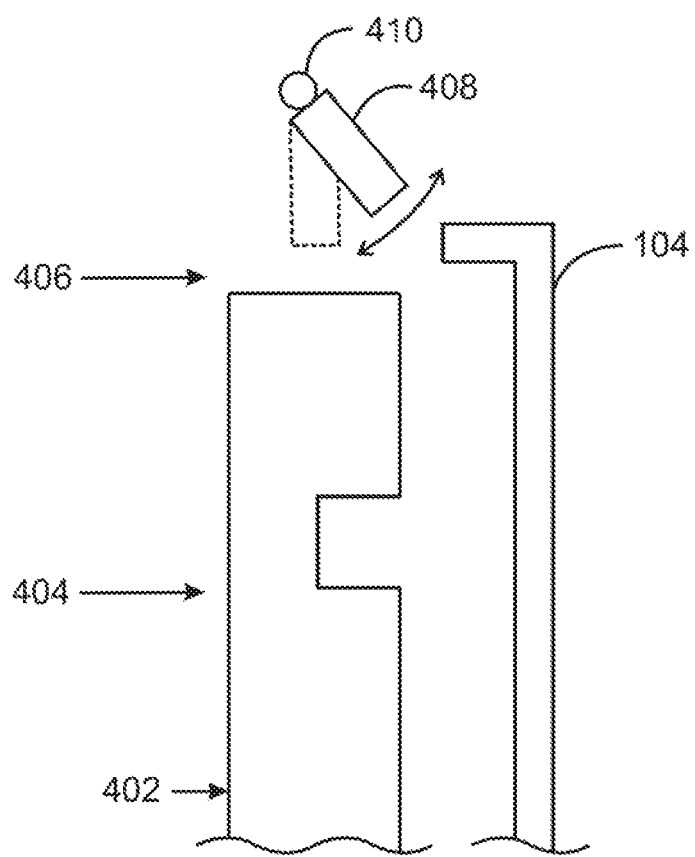
FIG. 4 is an example of a close-up of are adjustable expansion slot used for a full height bracket.

FIG. 4 is an example 400 of a close-up of an adjustable expansion slot used for a full height bracket. As seen in FIG. 4, only the top portion of several components is shown. Like numbered items are as described in FIG. 1. A side view of a notched panel 402 shows notches that are part of an opening for expansion slot brackets. The notched panel 402 is a part of the panel of a computing device 100. Only engaging portions of the panel are shown for simplicity, however it should be understood that many additional aspects of the notched panel 402 of the computing device are not illustrated in FIG. 4. A low profile notch 404 is located at a distance that corresponds to a low profile expansion slot bracket 106. A full height notch 406 is located at a distance that corresponds to a full height bracket 104. In some examples additional notches are included at additional distances from the guiding portion of the opening for the full height expansion slot bracket 104.

In some examples, a full height expansion slot bracket 104 may be placed into an inserted position and secured by insertion into the full height notch 406. The full height notch may provide snugness through the friction generated by flush contact between the bracket and the full height notch 406. The full height expansion slot bracket 104 may be secured by a bracket retention mechanism 408 that pivots in and out of position to secure the full height expansion slot bracket 104 in an inserted position. The bracket retention mechanism 408 may be plastic, metal, or any other suitable material to secure the full height expansion slot bracket 104 into a secured position. The bracket retention mechanism 408 may pivot in and out of position around a swivel 410. The swivel 410 allows motion of the bracket retention mechanism 408 of the can be on either side of an opening 102. The swivel may be part of a panel of a computing device 100, the swivel 410 may be a part of the bracket retention mechanism 408, and it may be a separate component 410.

Other configurations of the full height and low profile notch and retention mechanism are possible, including one way clips and rubberized surfaces to more securely fasten and provide a snug fit between the fastener notch and the bracket. For example, the notches may be tapered to guide a full height bracket towards the panel of the computing device. The notch may also be a one-way clip such that a semi-flexible member allows a notch of the bracket fastening end 112 to slide past in only one direction, but clicks into place after the bracket fastening end 112 has passed a certain point in the inserted position.

Figure 5:
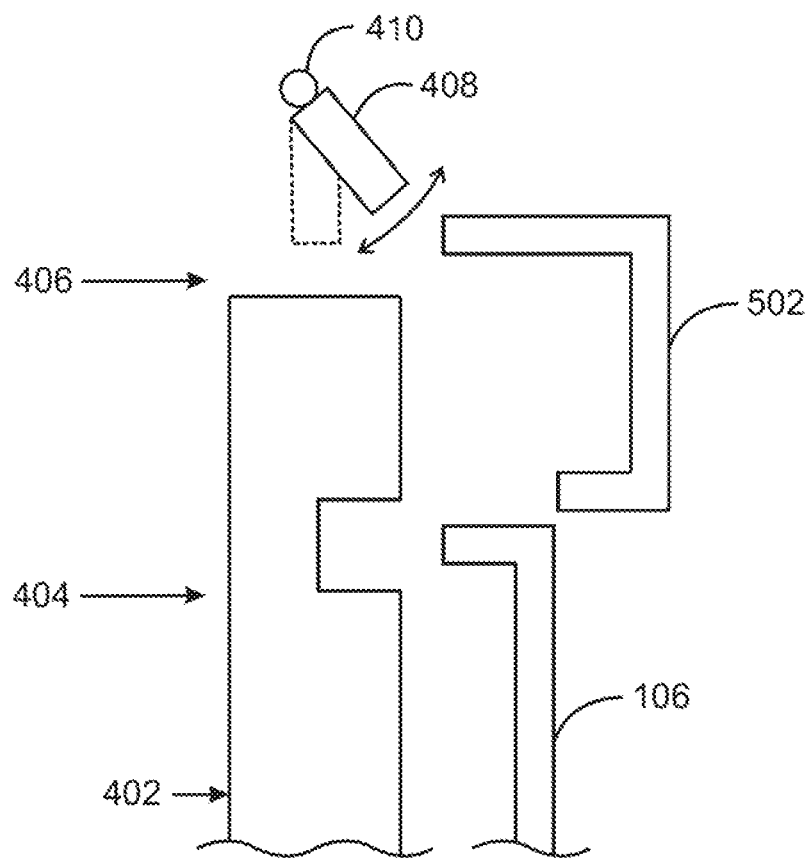
FIG. 5 is an example close-up of an adjustable expansion slot used for a low profile bracket.

FIG. 5 is an example close-up 500 of an adjustable expansion slot used for a low profile bracket. As seen in FIG. 5, only the top portion of several components is shown. Like numbered items are as described in FIG. 1 and FIG. 4. The low profile expansion slot bracket 106 fits from the guiding portion 118 to the low profile notch 404 of the notched panel 402 of a computing device 100. In some examples a U-shaped gap filler 502 may be inserted in-between the full height notch 406 and the low profile notch 404.

This U-shaped gap filler 502 is similar to the rigid component fastener 208, however can also be inserted without a fastening portion 118 and secure a bracket in place by pressure or friction alone. In some examples the U-shaped gap filler 502 may prevent degradation of the EMI grounding and seal though its composition of plastic or metal.

The U-shaped gap filler 502 may be secured by the bracket retention mechanism 408 that pivots in and out of position to secure the U-shaped gap filler 502 whenever the U-shaped gap filler 502 is used. The bracket retention mechanism 408 may pivot around a swivel 410 which is attached to a panel of a computing device 100. This bracket retention device 408 can provide pressure on the U-shaped gap filler 502 that translates across the U-shaped gap filler 502 and also applies pressure on the low profile expansion slot bracket 106 to aid in securing it into an inserted position of an opening 102.

Figure 6:
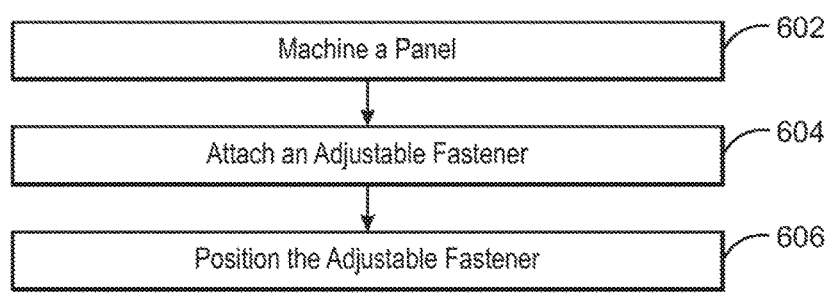
FIG. 6 is an example method for manufacturing an adjustable expansion slot.

FIG. 6 is an example method 600 for manufacturing an adjustable expansion slot. In this example method, an adjustable expansion slot apparatus may be manufactured. This apparatus may include the apparatus and systems described in FIGS. 1-4.

In block 602, a panel of a computing device is formed. The panel includes an opening for an expansion slot bracket. The panel of the computing device may include a guiding portion on one end of the opening to guide and secure one end of the expansion slot bracket into the expansion slot opening.

In block 604, an adjustable fastener is attached to the panel of the computing device. In some examples, the fastener can be grooves or notches and may be cut from the panel or may be separate components added onto the panel in suitable places along the opening. In some examples the adjustable fastener can include a sliding adjustable fastener, a sliding portion, or an insertable and removable component, In some examples these components may be attached to the panel of the computing device in any suitable combination to allow the fastening of expansion slot brackets with a number of sizes.

In block 606, the adjustable fastener is adjusted such that it remains parallel to the opening and surface of the panel and moves closer and further from the guiding portion of the opening. The movement of the adjustable fastener may be to accommodate size variations of the expansion slot bracket and may also be to reduce degradation of EMI grounding by leaving covered openings in the panel of the computing device.

While the present techniques may be susceptible to various modifications and alternative forms, the techniques discussed above have been shown only by way of example. It is to be understood that the technique is not intended to be limited to the particular examples disclosed herein. Indeed, the present techniques include all alternatives, modifications, and equivalents falling within the scope of the following claims.

What is claimed is:

1. An adjustable expansion slot, comprising:
a panel of a computing device with an opening to receive an expansion slot bracket for an input and output device, the panel including a guiding portion adjacent to the opening to guide a first end of the expansion slot bracket into a inserted position;
an adjustable fastener to fasten a second end of the expansion slot bracket into the inserted position, wherein the adjustable fastener is adjustably positioned on the opening opposite the guiding portion; and
wherein the position of the adjustable fastener is to be adjusted to accommodate size variations of the expansion slot bracket.

2. The adjustable expansion slot of claim 1, wherein the adjustable fastener is a sliding component held to the panel by a slide rail which allows movement only parallel to the opening with reference to the guiding portion.

3. The adjustable expansion slot of claim 2, further comprising an anchoring hook attached to the sliding component and to engage with the slide rail at a plurality of positions.

4. The adjustable expansion slot of claim 3, further comprising an exposed leverage point, engaged with the anchoring hook, that when manipulated by a user disengages the anchoring hook from the slide rail to allow movement of the sliding component until the exposed leverage point is no longer manipulated by the user such that the anchoring hook re-engages with the slide rail.

5. The adjustable expansion slot of claim 1, further comprising:
a first set of grooves at a first distance along the opening corresponding to a length of a full height peripheral component interconnect (PCI) expansion slot bracket; and
a second set of grooves at a second distance along the opening corresponding to a length of a low profile PCI Expansion slot bracket.

6. The adjustable expansion slot of claim 5, wherein the adjustable fastener is a sliding portion movable to either the first set of grooves or the second set of grooves.

7. The adjustable expansion slot of claim 1, wherein the adjustable fastener is an insertable and removable component which fits into a space in the opening spanning from the first set of grooves and the second set of grooves.

8. The adjustable expansion slot of claim 7, wherein the adjustable fastener is insertable into the opening and is secured by a bracket retention mechanism that pivots in and out of position to secure the adjustable fastener.

9. A computing device with an adjustable expansion slot to match an expansion slot bracket, comprising:
a panel of a computing device with an opening to receive an expansion slot bracket for an input and output device, the panel including a guiding portion adjacent to the opening to guide a first end of the expansion slot bracket into a inserted position;
an adjustable fastener to fasten a second end of the expansion slot bracket into the inserted position, wherein the adjustable fastener is adjustably positioned along the edge of the opening opposite the guiding portion; and
wherein the position of the adjustable fastener is to be adjusted parallel to the opening with reference to the guiding portion to accommodate size variations of the expansion slot bracket.

10. The computing device of claim 9, wherein the adjustable fastener is a sliding component held to the panel by a slide rail which allows movement only parallel to the opening with reference to the guiding portion.

11. The computing device of claim 10, comprising an anchoring hook attached to the sliding component and to engage with the slide rail at a plurality of positions.

12. The computing device of claim 9, comprising:
a first set of grooves at a first distance along the opening corresponding to a length of a full height peripheral component interconnect (PCI) expansion slot bracket; and
a second set of grooves at a second distance along the opening corresponding to a length of a low profile PCI Expansion slot bracket.

13. A method for manufacturing an adjustable expansion slot to match an expansion slot bracket, comprising:
forming a panel of a computing device with an opening to receive an expansion slot bracket for an input and output device, the panel including a guiding portion adjacent to the opening to guide a first end of the expansion slot bracket into a inserted position;
attaching an adjustable fastener on the opening opposite the guiding portion, the adjustable fastener to fasten a second end of the expansion slot bracket into the inserted position; and
positioning the adjustable fastener to be movable parallel to the opening with reference to the guiding portion in order to accommodate size variations of the expansion slot bracket.

14. The method of claim 1, wherein the adjustable fastener is a sliding component held to the panel by a slide rail which allows movement only parallel to the opening with reference to the guiding portion.

15. The method of claim 13, comprising:
forming a first set of grooves at a first distance along the opening corresponding to a length of a full height peripheral component interconnect (PCI) expansion slot bracket;
forming a second set of grooves at a second distance along the opening corresponding to a length of a low profile PCI Expansion slot bracket; and
wherein the adjustable fastener is a sliding portion movable to either the first set of grooves or the second set of grooves.

\* \* \* \* \*

UNITED STATES PATENT AND TRADEMARK OFFICE
CERTIFICATE OF CORRECTION

PATENT NO.        : 10,082,843 B2
APPLICATION NO.   : 15/519775
DATED             : September 25, 2018
INVENTOR(S)       : James Smalls et al.

Page 1 of 1

It is certified that error appears in the above-identified patent and that said Letters Patent is hereby corrected as shown below:

In the Claims

In Column 8, Line 5, Claim 14, delete "1," and insert -- 13, --, therefor.

Signed and Sealed this
First Day of January, 2019

Andrei Iancu
*Director of the United States Patent and Trademark Office*